United States Patent
Lee et al.

(10) Patent No.: US 7,653,058 B2
(45) Date of Patent: Jan. 26, 2010

(54) OPTICAL NETWORK FOR BI-DIRECTIONAL WIRELESS COMMUNICATION

(75) Inventors: Jong-Hun Lee, Suwon-si (KR); Young-Seop Han, Suwon-si (KR); Yun-Je Oh, Yongin-si (KR); Jong-Hoon Lim, Suwon-si (KR); Kyung-Tack Kwon, Seoul (KR); Jeong-Sik Cho, Suwon-si (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 575 days.

(21) Appl. No.: 11/355,806

(22) Filed: Feb. 16, 2006

(65) Prior Publication Data

US 2006/0184976 A1    Aug. 17, 2006

(30) Foreign Application Priority Data

Feb. 16, 2005    (KR) ...................... 10-2005-0012805

(51) Int. Cl.
*H04L 12/28* (2006.01)
*H04J 14/08* (2006.01)
*H04N 7/18* (2006.01)

(52) U.S. Cl. ...................... 370/390; 370/463; 370/389; 398/98; 725/81

(58) Field of Classification Search ......... 370/329–337, 370/389–395, 410–458; 398/67–68, 115–139, 398/71–98; 725/14–81, 131–135
See application file for complete search history.

(56) References Cited

U.S. PATENT DOCUMENTS

| | | | | |
|---|---|---|---|---|
| 6,498,667 | B1* | 12/2002 | Masucci et al. | 398/98 |
| 6,778,550 | B1* | 8/2004 | Blahut | 370/443 |
| 6,931,013 | B2* | 8/2005 | Saikusa | 370/395.4 |
| 7,274,695 | B2* | 9/2007 | Kim et al. | 370/389 |
| 7,372,854 | B2* | 5/2008 | Kang et al. | 370/390 |
| 7,382,982 | B2* | 6/2008 | Lee et al. | 398/100 |
| 7,412,169 | B2* | 8/2008 | Joo et al. | 398/72 |
| 7,450,608 | B2* | 11/2008 | Choi et al. | 370/463 |
| 2004/0022536 | A1* | 2/2004 | Koh et al. | 398/41 |
| 2005/0207398 | A1* | 9/2005 | Choi et al. | 370/352 |
| 2005/0235307 | A1* | 10/2005 | Relan et al. | 725/14 |
| 2006/0067691 | A1* | 3/2006 | Hirano et al. | 398/71 |

FOREIGN PATENT DOCUMENTS

KR    2004-0082555    9/2004

* cited by examiner

*Primary Examiner*—M. Phan
(74) *Attorney, Agent, or Firm*—Cha & Reiter, LLC

(57) ABSTRACT

A wireless transceiving system capable of processing multi-channel broadcast signals and Ethernet signals from an Ethernet PON (Passive Optical Network), the wireless transceiving system includes a wireless STB (Set-top Box) transmitter for wirelessly transmitting broadcast signals which are multi-channel image signals and Ethernet signals; and at least one wireless STB receiver for receiving the broadcast signals and the Ethernet signals transmitted from the wireless STB transmitter to output image signals and audio signals corresponding to the received broadcast signals, and to support an Ethernet port based on the received Ethernet signals.

11 Claims, 4 Drawing Sheets

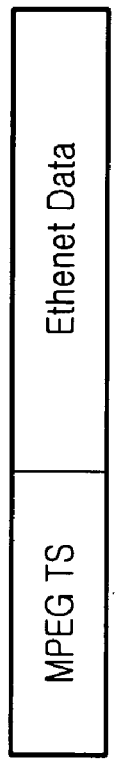
FIG.3A
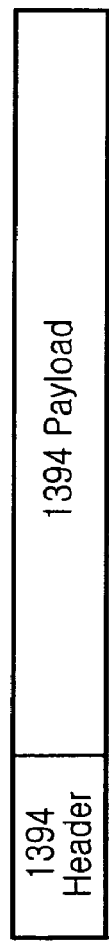
FIG.3B
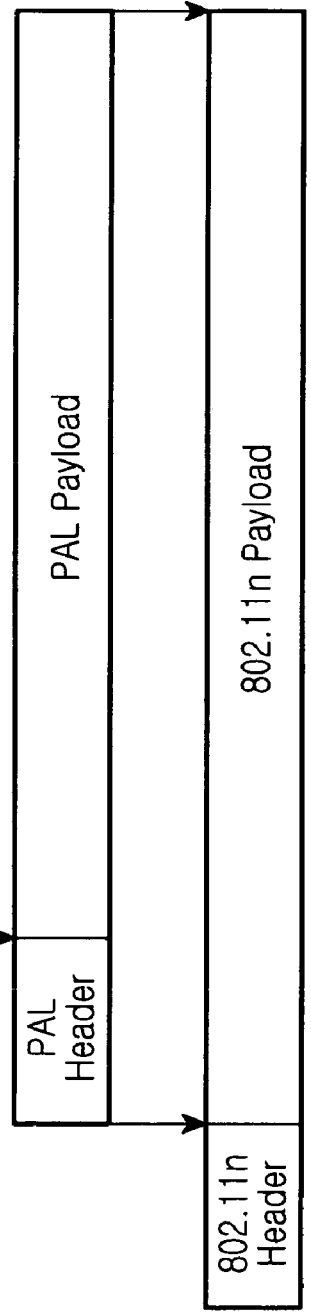
FIG.3C
FIG.3D

OPTICAL NETWORK FOR BI-DIRECTIONAL WIRELESS COMMUNICATION

CLAIM OF PRIORITY

This application claims priority to an application entitled "Wireless Transceiving System," filed in the Korean Intellectual Property Office on Feb. 16, 2005 and assigned Serial No. 2005-12805, the contents of which are hereby incorporated by reference.

BACKGROUND OF THE INVENTION

1. Field of the Invention

The present invention relates to an Ethernet Passive Optical Network, and more particularly to the wireless transceiving system capable of receiving and processing both multi-channel broadcast signals and Ethernet signals.

2. Description of the Related Art

In order to effectively provide a mass storage, high speed data service, and a real time digital broadcast/image service to subscribers, a data transmission speed of more than 100 Mb/s is generally required for those services. Therefore, it is impossible to provide such services through a conventional xDSL or a cable modem which has only a maximum 50 Mb/s of the data transmission rate. Accordingly, in recent years, there has been a demand for a high speed transmission network capable of providing the mass storage, high speed data service, and real time digital broadcast/image service. In order to meet this demand, several optical networks are already proposed. Among them, Passive Optical Network (PON) has prevailed because of its low construction costs. PON include for example, ATM-PON based on the ATM (Asynchronous Transfer Mode), WDM-PON based on the WDM (Wavelength Division Multiplexing), Ethernet-PON based on the Ethernet and etc.

The Ethernet PON scheme has been developed mainly in pursuit of receiving and processing the communication data therein. In order to transmit data in a Ethernet PON, gigabit Ethernet signals of 1.25 Gb/s are transmitted in the direction from an Optical Line Terminal (OLT) to Optical Network Unit/Optical Network Terminals (ONU/ONTs) by using a signal at a wavelength of 1550 nm, while the gigabit Ethernet signal of 1.25 Gb/s are transmitted in the direction from the ONTs to the OLT by using a signal at a wavelength of 1310 nm.

FIG. 1 illustrates the structure of a typical Ethernet Passive Optical Network according to the prior art. As shown, the typical Ethernet PON includes an OLT (Optical Line Terminal) 100 functioning as a sub-system located between users and service nodes for receiving broadcast signals and communication signals transmitted from a broadcast provider and a communication service provider, converting the received broadcast signals and the received communication signals into broadcast optical signals and communication optical signals, respectively, and then combining the converted broadcast and communication optical signals into single optical signals to be transmitted, a beam splitter 110, a plurality of ONTs (Optical Network Terminals) 120 and 122 functioning as users' devices for receiving information from the OLT 100 and relaying the received information to the users, a plurality of set-top boxes (hereinafter referred to as "STB") 130, 133, 134 and 135, and optical fiber lines connecting the OLT 100 with the plurality of ONTs 120 and 122.

More specifically, the OLT 100 receives the broadcast signals via a broadcast network and transmit the light-converted and light-amplified signals to the beam splitter 110, while the OLT 100 also receives data information from an IP (Internet Protocol) router 111 via an IP network, and light-converts the received data signals into optical data signals to transmit the optical data signals to the beam splitter 110. Furthermore, the OLT 100 receives data signals from the ONTs 120 and 122 via the beam splitter 110 and transmits the received data signals to the IP network through the IP router 111.

ONTs 120 and 122 receive broadcast signals through the broadcast receivers to transmit the received broadcast signals to the users via the broadcast STBs (Set-top Box) 130, 133, 134 and 135. Furthermore, the ONTs 120 and 122 receive the communication data through communication receivers to transmit the received communication data to the users via an E-PON ONT function processor (not shown), while the ONTs 120 and 122 receive also communication data from the users via the E-PON ONT function processor to transmit the communication data to the OLT 100 via a burst-mode transmitter (not shown).

Conventional broadcast TV service system, based on IP, receive broadcasting signals provided by an apparatus connected to a broadcast TV headend and/or provided by the content or program provider. Received broadcast signals are encoded into MPEG2/4 frames, and corresponding image services are provided to subscriber terminals based on the encoded MPEG2/4 frames. Such image data can be received through the subscriber's TV or computer terminal connected to the STB at the home according to a corresponding channel selected by the subscriber.

Such a structure as that disclosed in the prior art requires that subscribers wishing to have access to broadcast services in multiple locations in their home necessitate locating STBs in each room or part of rooms in the home. Each STB would then need to be interconnected and/or connected to corresponding terminals with physical wires. Such physical wires have brought about a variety of restrictions to construct a home network for transmitting the broadcast signals and the Ethernet signals through the wires.

SUMMARY OF THE INVENTION

Accordingly, the present invention has been made to solve the above-mentioned problems and provides additional advantages, by providing a wireless transceiving system including a wireless STB transmitter and a plurality of wireless STB receivers, so that a plurality of STBs can be easily set up to construct a home network on an economical basis.

Another aspect of the present invention is to provide a wireless STB transmitter and wireless STB receivers which can be interlinked with mobile multimedia devices.

In one embodiment, there is provided a wireless transceiving system capable of receiving and processing multi-channel broadcast signals and Ethernet signals from an Ethernet PON (Passive Optical Network), the wireless transceiving system includes a wireless STB (Set-top Box) transmitter for wirelessly transmitting broadcast signals which are multi-channel image signals and Ethernet signals; and at least one wireless STB receiver for receiving the broadcast signals and the Ethernet signals transmitted from the wireless STB transmitter to output image signals and audio signals corresponding to the received broadcast signals, and to support an Ethernet port based on the received Ethernet signals.

BRIEF DESCRIPTION OF THE DRAWINGS

The above features and advantages of the present invention will be more apparent from the following detailed description taken in conjunction with the accompanying drawings, in which:

FIGS. 3a-3b illustrates data structures provided for explaining the data flow of the wireless STB according to one embodiment of the present invention.

DETAILED DESCRIPTION

Hereinafter, embodiments of the present invention will be described with reference to the accompanying drawings. For the purposes of clarity and simplicity, a detailed description of known functions and configurations incorporated herein will be omitted as it may make the subject matter of the present invention unclear.

According to one embodiment of the present invention, a wireless transceiving system includes a STB (Set-top Box) transmitter and wireless STB receivers, wherein the transceiving system can receive multi-channels broadcast signals as well as Ethernet signals at the same time through a single STB transmitter, and provide the received broadcast signals and Ethernet signals to the users through a plurality of STB receivers located through out a house or a building. The terminology "broadcast signal" herein used is regarded as being HD (High Definition) grade hereinafter.

Figure 1:
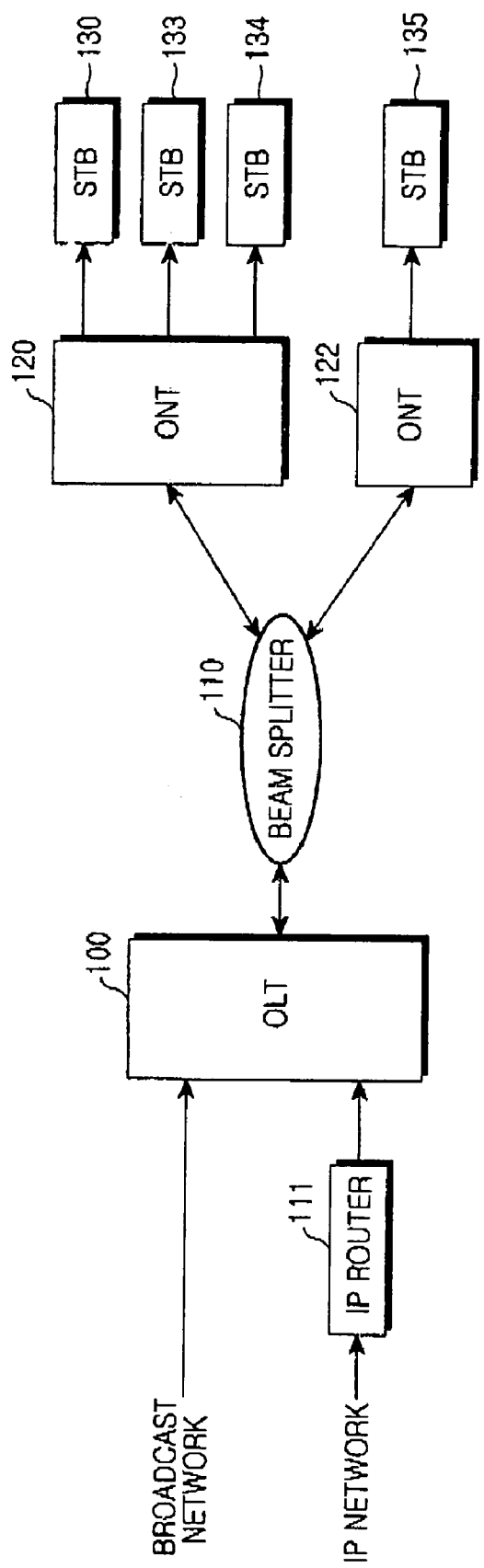
FIG. 1 illustrates a structure of a typical Ethernet passive optical network according to a prior art.
Figure 2:
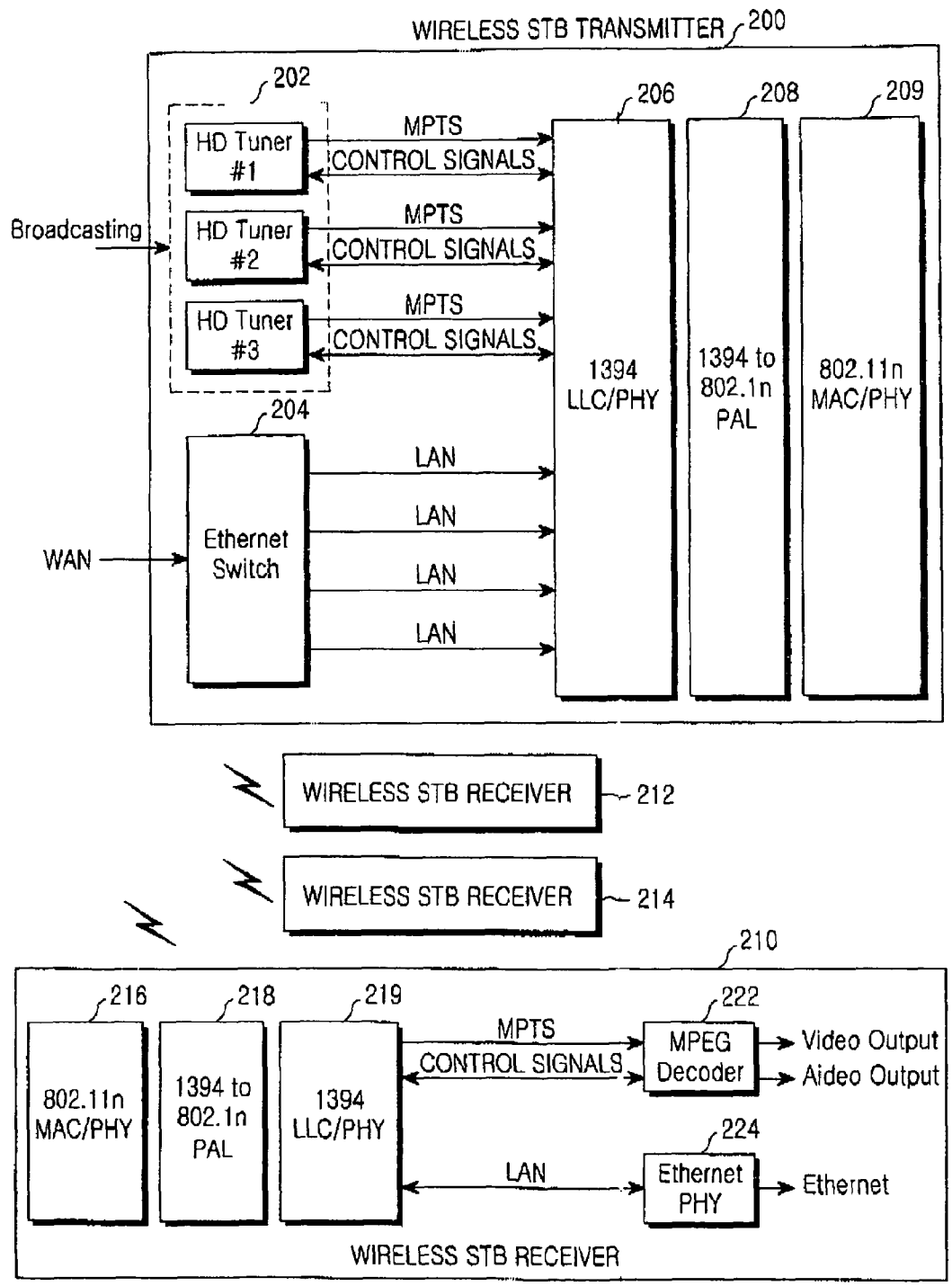
FIG. 2 illustrates the structure of a wireless STB (Set-top Box) transceiving system according to one embodiment of the present invention.

FIG. 2 illustrates the structure of a wireless multi-channel STB (Set-top Box) or a multi-channel wireless transceiving system according to one embodiment of the present invention.

Referring to FIG. 2, the multi-channel wireless STB transceiving system includes a wireless STB transmitter 200 and a plurality of wireless STB receivers 210, 212 and 214. In this embodiment of the present invention, the number of the wireless STB receivers is three for illustrative purposes. However, the number of the STB receivers is not limited to the three, but can be extended further without limitation in accordance with the teachings of the present invention.

The wireless STB transmitter 200, transmits wirelessly broadcast signals which are multi-channel image signals, and Ethernet signals, whereas the wireless STB receivers 210, 212 and 214 are coupled to image and audio ports of a TV and/or Ethernet port located at a certain space in a home or office. The STB receivers 210, 212 and 214 receive the signals transmitted from the transmitter 200 and transmit the received signals to the TV, computers or other electronic devices.

Now, a more detailed description is provided regarding the internal structure of the wireless STB transmitter 200.

Referring to FIG. 2, the wireless transmitter 200 includes a plurality of HD tuners 202, an Ethernet switch 204, a 1394 LLC (Logical Link Control)/PHY (Physical Layer) 206, a 1394 to 802.11n PAL (Protocol Adaptation Layer) 208 and a 802.11n MAC (Medium Access Control)/PHY 209.

HD tuners 202 are able to receive not only ground wave signals, cable signals and satellite broadcast TV signals, but also analog and/or digital TV signals. When such HD tuners 202 receives a digital broadcast signal of, for example, ATSC (Advanced Television System Committee) scheme, the HD tuners 202 demodulate the received digital broadcast signal into a signal of MPEG2-TS (Motion Picture Expert Group 2—Transport Streams) type which is then output to the external part thereof. Also, in case that the HD tuners 202 receive analog signals to be then output in the form of CVBS (Composite Video Baseband Signal) and/or SIF (Sound Interface), this requires an apparatus for converting the analog image and audio signals to digital image and audio signals such as ITU656 and I2S.

The Ethernet switch 204 provides an interface between an external network and an internal network of the STB. Also, the Ethernet switch 204 has one WAN (Wide Area Network) and at least two LAN (Local Area Network) Ports in order to provide Ethernet ports via a plurality of STBs to the subscriber.

The wireless STB transmitter 200 disclosed according to the present invention uses an IEEE 1394 protocol in order to send not only real time and multi-channel broadcast signals of HD grade, but also a plurality of Ethernet signals to the wireless STB receivers 210, 212 and 214 at the same time. Such an IEEE 1394 protocol has a wide bandwidth of 800 Mbps so that both the isochronous data like the real time broadcast signals and the asynchronous data like the Ethernet data can be transmitted simultaneously therewith.

According to one embodiment of the present invention, the IEEE 1394 LLC (Logical Link Control)/PHY (Physical Layer) 206 receives the multi-channel broadcast signals and the Ethernet signals shown in FIG. 3a through the HD tuners 202 and the Ethernet switch 204, respectively. Thereafter, the IEEE 1394 LLC/PHY 206 performs data-encapsulation of both the received multi-channel broadcast signals and the received Ethernet signals through the isochronous channels and the asynchronous channels to then add a header to the resultant encapsulated data as shown in FIG. 3b. As a result, the IEEE 1394 LLC/PHY 206 outputs the encapsulated data shown in FIG. 3b to the 1394 to 802.11n PAL 208.

The 1394 to 802.11n PAL 208 has the function of overcoming some differences between the IEEE 1394 protocol and the 802.11n protocol. Specifically, the differences rated to the protocol's clock speed. IEEE 1394 LLC/PHY 206 provide a Service Data Unit (SDU), an expire time and a window size which are different from those of the 802.11n PAL 208. A buffer such as the FIFO (First Input First Output) is necessary to overcome the differences by matching the clock speed of the IEEE 1394 and the 802.11n protocols.

The IEEE 1394 LLC/PHY 206 outputs the data-encapsulated broadcast signals and Ethernet signals to the PAL 208 in which the IEEE 1394 protocol and the 802.11n protocol are matched with each other and added with a PAL header to output the resultant signals as shown in FIG. 3c to the 802.11n MAC (Medium Access Control)/PHY (Physical Layer) 209. Then, the 802.11n MAC/PHY 209 adds an 802.11n header to the signals shown in FIG. 3c to transmit wirelessly the final resultant data of FIG. 3d to the wireless STB receivers 210, 212 and 214.

Hereinafter, a description will be provided about the operation of the 1394 to 802.11n PAL 208 more concretely, referring to the FIG. 4 which is a flow chart for explaining the operation procedure thereof.

Figure 4:
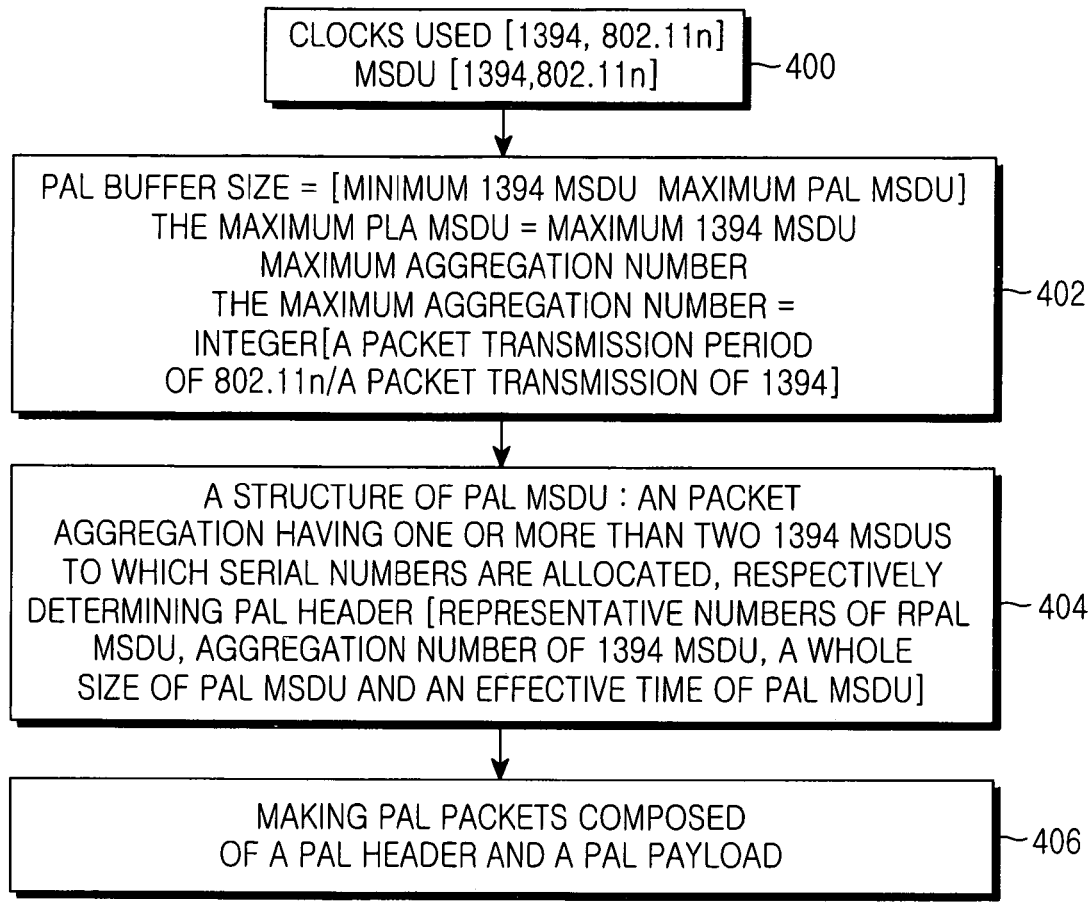
FIG. 4 is a flow chart for explaining an operation process of a 1394 to 802.1 In PAL according to one embodiment of the present invention

Referring to FIG. 4, firstly in step 400, the 1394 to 802.11n PAL 208 uses an MSDU (Maximum Service Data Unit) and a clock which is different from those of the 1394 LLC/PHY 206 and the 802.11n 209.

Next, in step 402, the 1394 to 802.11n PAL 208 prepares a buffer in order to overcome a difference in packet transmission rate between the 1394 LLC/PHY 206 and the 802.11n MAC/PHY 209. Specifically, because the 1394 LLC/PHY 206 has a 125 μs of the packet transmission rate and the 802.11n MAC/PHY 209 has a 1 ms of the packet transmission rate, there is that difference between the LLC/PHY 206 and the PAL 209 which should be matched with each other. The buffer used in the PAL 209 has a size determined depending on the packet transmission periods of the 1394 MSDU and the 802.11n. Specifically, the buffer has a size range from the minimum 1394 MSDU to the maximum PAL MSDU. The maximum PAL MADU, $PAL_{max}$ is calculated by multiplying the maximum 1394 MSDU, $1394_{max}$ by the maximum aggregation number of the 1394 MSDU, $1394_{agg\text{-}max}$. The maximum aggregation number, $agg_{max}$ is a value calculated by dividing the 802.11n packet transmission period, $802.11n_{per}$ by the 1394 packet transmission period, $1394_{per}$ and taking only integer number from the resultant value of the division. For example, assuming that $802.11n_{per}$=1 ms, and $1394_{per}$=125 µs, therefore maximum aggregation number, $agg_{max}$="8".

Next, in step 404, the 1394 to 802.11n PAL 208 forms the PAL packet. Such a PAL packet includes a PAL header and a PAL Payload. The PAL header has representative numbers of the PAL MSDU, a whole size of the PAL MSDU, an effective time of the PAL MSDU and etc., and the PAL payload has an aggregation packet composed of one 1394 MSDU or more than two 1394 MSDUs to which serial numbers are allocated, respectively.

Next, in step 406, the 1394 to 802.11n PAL 208 encapsulates the PAL header and the PAL payload into a 802.11n header and a 802.11n payload which are then sent to the 802.11n MAC/PHY 209.

Referring back to FIG. 2, the wireless STB receiver 210, receives the broadcast signals and the Ethernet signals transmitted from the wireless STB transmitter 200 disclosed in FIG. 2. The internal structure of the wireless STB receiver 210 is identical to those of the other wireless STB receiver 212 and 214 disclosed in FIG. 2. Therefore, for simplicity and to avoid redundancy, the internal structure about only the wireless STB receiver 210 will be described, referring to FIG. 2. According to one embodiment of the present invention, the wireless STB receiver 210 includes a 802.11n MAC/PHY 216, a 1394 to 802.11n PAL (Protocol Adaptation Layer) 218, a 1394 LLC/PHY 219, an MPEG decoder 212 and an Ethernet PHY 214.

When the wireless STB transmitter 200, in FIG. 2, transmits wirelessly the broadcast signals and the Ethernet signals, the 802.11n MAC/PHY 216 in the wireless STB receiver 210 receives the broadcast and Ethernet signals which are then sent to the 1394 to 802.11n PAL 218. Then the 1394 to 802.11n PAL 218 extracts the data-encapsulated IEEE 1394 data from the received broadcast and Ethernet signals through a process of which sequence is reversed with respect to the process of the PAL 208 of the STB transmitter 200 disclosed in FIG. 2. Thereafter, the data-encapsulated IEEE 1394 data are output to the 1394 LLC/PHY 219 in which the data-encapsulated IEEE 1394 data are divided into the MPEG-TS broadcast signals and the Ethernet signals. Finally, the divided broadcast signals are output to the MPEG decoder 222, the divided Ethernet signals are output to the Ethernet PHY 224, respectively.

The MPEG-TS broadcast signals received in the MPEG decoder 222 are then converted into the image signals and the audio signals through which the users can watch the image pictures and listen to the audio sounds, accordingly. Also, the Ethernet signals received in the Ethernet PHY 224 provide the Ethernet ports to users.

As mentioned above, a signal for controlling the tuners is essentially in order to transmit and receive the signals between the wireless STB transmitter 200 and the wireless STB receiver 210 by wireless communication. Typically, the tuners are controlled by a I2C (Inter IC Communication) signal. Especially, in the present invention, the wireless STB receiver 210 encapsulates the I2C signals with an IEEE 1394 asynchronous packet to transmit the encapsulated I2C signals. Then the encapsulated I2C signals are de-capsulated in the wireless STB transmitter 200 which controls the tuners with the de-capsulated I2C signals.

As mentioned above, the present invention provides an easy solution to setting up a wireless STB transmitter and a plurality of wireless STB receivers in a various locations, such as in the home. Furthermore, the present invention can facilitate and accelerate to establish future home networks with lower cost by using the wireless STB transmitter and the wireless STB receivers which can be wirelessly communicated with each other, and also which can be wirelessly interlinked with mobile multimedia players.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A wireless transceiver for receiving and processing multi-channel broadcast signals and Ethernet signals from an Ethernet PON (Passive Optical Network), comprising:
   a wireless STB (Set-top Box) transmitter for wirelessly transmitting the broadcast signals and Ethernet signals;
   wherein the wireless STB transmitter comprises:
   at least one tuner for receiving the broadcast signals;
   an Ethernet switch including one WAN (Wide Area Network) port and at least two LAN (Local Area Network) ports in order to provide an Ethernet port, the Ethernet switch outputting the Ethernet signals;
   a Logical Link Control/Physical Layer (LLC/PHY) for performing data-encapsulations of the broadcast signals and the Ethernet signals through an isochronous channel and an asynchronous channel, respectively, and outputting the encapsulated data;
   a Protocol Adaptation Layer (PAL) for matching protocol differences between the LLC/PHY and a Medium Access Control/Physical Layer (MAC/PHY) with the encapsulated data and outputting the encapsulated data; and
   the MAC/PHY for receiving the encapsulated data from the PAL and transmitting wirelessly the encapsulated data.

2. A wireless transceiving system for receiving and processing multi-channel broadcast signals and Ethernet signals from an Ethernet PON (Passive Optical Network), comprising:
   a wireless Set-Top Box (STB) transmitter for wirelessly transmitting the broadcast signals and Ethernet signals, and
   at least one wireless STB receiver, provided within a predetermined location, for receiving the broadcast signals and the Ethernet signals transmitted from the wireless STB transmitter to output image signals and audio signals corresponding to the received broadcast signals and to support an Ethernet port based on the received Ethernet signals, wherein the wireless STB transmitter comprises:
   at least one tuner for receiving the broadcast signals;
   an Ethernet switch including one WAN (Wide Area Network) port and at least two LAN (Local Area Network) ports in order to provide the Ethernet port, the Ethernet switch outputting the Ethernet signals;
   a Logical Link Control/Physical Layer (LLC/PHY) for performing data-encapsulations of the broadcast signals and the Ethernet signals through an isochronous channel and an asynchronous channel, respectively, and outputting the encapsulated data;

a Protocol Adaptation Layer (PAL) for matching protocol differences between the LLC/PHY and a Medium Access Control/Physical Layer (MAC/PHY) with the encapsulated data and outputting the encapsulated data; and the MAC/PHY for receiving the data from the PAL and transmitting wirelessly the received data.

3. The wireless transceiving system as claimed in claim 2, wherein the PAL comprises a buffer for matching differences in clocks, service data units, expiring times and window sizes of the protocols between the LLC/PHY and the MAC/PHY to match the protocols thereof with each other.

4. The wireless transceiving system as claimed in claim 3, wherein the PAL encapsulates a PAL payload and a PAL header with a payload to output the encapsulated data to the MAC/PHY, wherein the PAL header has a representative number of a PAL Maximum Service Data Unit (MSDU), a whole size of the PAL MSDU, and an effective time of the PAL MSDU, and wherein the PAL payload has an aggregation packet having one or more MSDUs to which serial numbers are allocated, respectively.

5. The wireless transceiving system as claimed in claim 4, wherein maximum number of the aggregation packet is a value calculated by dividing a packet transmission period of the MAC/PHY by a packet transmission period of the LLC/PHY.

6. The wireless transceiving system as claimed in claim 2, wherein the wireless STB receiver comprises:

a Medium Access Control/Physical Layer (MAC/PHY) for receiving the encapsulated data transmitted wirelessly from the wireless STB transmitter;

a Protocol Adaptation Layer (PAL) for matching protocol differences between the LLC/PHY and the MAC/PHY to match the encapsulated data and outputting the matched encapsulated data;

the LLC/PHY for dividing the encapsulated data into the broadcast signals and the Ethernet signals to be output, respectively;

an MPEG decoder for receiving the broadcast signals and converting the received broadcast signals into image signals and audio signals to be output, respectively; and an Ethernet PITY for providing Ethernet porters for the Ethernet signals.

7. A wireless system for processing multi-channel broadcast signals and Ethernet signals transmitted from an Ethernet Passive Optical Network (PON), comprising:

a wireless transmitter for transmitting the broadcast signals and Ethernet signals; and a plurality of wireless receiver, located at different locations, for outputting image signals and audio signals corresponding to the received broadcast signals and supporting an Ethernet port based on the received Ethernet signals, wherein the wireless transmitter comprises:

at least one tuner for receiving the broadcast signals;

an Ethernet switch including one Wide Area Network (WAN) port and at least two LAN (Local Area Network) ports in order to provide the Ethernet port, the Ethernet switch outputting the Ethernet signals;

a Logical Link Control/Physical Layer (LLC/PHY) for performing data-encapsulations of the broadcast signals and the Ethernet signals through an isochronous channel and an asynchronous channel, respectively, and outputting the encapsulated data;

a Protocol Adaptation Layer (PAL) for matching protocol differences between the LLC/PHY and a Medium Access Control/Physical Layer (MAC/PHY) with the encapsulated data and outputting the encapsulated data; and the MAC/PHY for receiving the data from the PAL and transmitting wirelessly the received data.

8. The wireless system as claimed in claim 7, wherein the PAL comprises a buffer for matching differences in clocks, service data units, expiring times and window sizes of the protocols between the LLC/PHY and the MAC/PHY to match the protocols thereof with each other.

9. The wireless system as claimed in claim 8, wherein the PAL encapsulates a PAL payload and a PAL header with a payload to output the encapsulated data to the MAC/PHY, wherein the PAL header has a representative number of PAL Maximum Service Data Unit (MSDU), a whole size of the PAL MSDU, and an effective time of the PAL MSDU, and the PAL payload has an aggregation packet having one or more MSDUs to which serial numbers are allocated, respectively.

10. The wireless system as claimed in claim 9, wherein maximum number of the aggregation packet is a value calculated by dividing a packet transmission period of the MAC/PHY by a packet transmission period of the LLC/PHY.

11. The wireless system as claimed in claim 7, wherein the wireless STB receiver comprises:

a Medium Access Control Physical Layer (MAC/PHY) for receiving the encapsulated data transmitted wirelessly from the wireless STB transmitter, a PAL (Protocol Adaptation Layer) for matching protocol differences between the LLC/PHY and the MAC/PHY to match the encapsulated data and outputting the matched encapsulated data;

an LLC/PHY for dividing the encapsulated data into the broadcast signals and the Ethernet signals to be output, respectively;

an MPEG decode for receiving the broadcast signals and converting the received broadcast signals into image signals and audio signals to be output, respectively; and an Ethernet PHY for providing Ethernet porters for the Ethernet signals.

* * * * *

UNITED STATES PATENT AND TRADEMARK OFFICE
CERTIFICATE OF CORRECTION

PATENT NO. : 7,653,058 B2  Page 1 of 1
APPLICATION NO. : 11/355806
DATED : January 26, 2010
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 919 days.

Signed and Sealed this

Twenty-third Day of November, 2010

David J. Kappos
*Director of the United States Patent and Trademark Office*